(12) United States Patent
Williams

(10) Patent No.: US 6,242,841 B1
(45) Date of Patent: Jun. 5, 2001

(54) STEPPER MOTOR WITH SHAPED MEMORY ALLOY ROTARY-DRIVER

(75) Inventor: Patricia L. Williams, Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 09/479,266

(22) Filed: Jan. 6, 2000

(51) Int. Cl.$^7$ .................................................. H02N 10/00
(52) U.S. Cl. .................. 310/306; 310/307; 310/40 MM; 60/527; 60/528
(58) Field of Search .................................. 310/306, 307, 310/40 MM; 60/527, 528

(56) References Cited

U.S. PATENT DOCUMENTS

| | | | |
|---|---|---|---|
| 3,280,550 | 10/1966 | Cassidy | 60/528 |
| 4,055,955 | * 11/1977 | Johnson | 60/527 |
| 4,275,561 | 6/1981 | Wang | 60/527 |
| 4,434,618 | 3/1984 | Dillon | 60/528 |
| 4,761,955 | 8/1988 | Bloch | 60/528 |
| 4,785,627 | 11/1988 | Al-Jaroudi | 60/527 |
| 4,860,040 | * 8/1989 | Tamamura et al. | 396/89 |
| 4,899,543 | * 2/1990 | Romanelli et al. | 60/527 |
| 4,965,545 | * 10/1990 | Johnson | 337/140 |
| 4,996,842 | 3/1991 | Goldstein | 337/140 |
| 5,031,711 | 7/1991 | Tanaka et al. | 180/7.1 |
| 5,086,618 | 2/1992 | Tanaka | 60/527 |
| 5,279,123 | 1/1994 | Wechsler et al. | 60/527 |
| 5,396,769 | 3/1995 | Brudnicki | 60/528 |
| 5,459,544 | 10/1995 | Emura | 396/257 |
| 5,955,801 | * 9/1999 | Romero et al. | 310/40 MM |
| 6,032,549 | * 3/2000 | Tokio et al. | 74/128 |
| 6,065,934 | * 5/2000 | Jacot et al. | 416/155 |
| 6,072,639 | * 6/2000 | Onda | 359/694 |

* cited by examiner

Primary Examiner—Joseph Waks
(74) Attorney, Agent, or Firm—Roger A. Fields

(57) ABSTRACT

A stepper motor includes the following. A rotatable hub. A first shaped memory alloy (abbreviated to SMA) rotary-driver, which when heated undergoes a shape change to rotationally couple with the hub and rotate the hub in a predetermined direction, and which can be deformed to reverse the shape change to rotationally uncouple from the hub. A first return spring connected with the first SMA rotary-driver for deforming the first SMA rotary-driver, when no longer heated, to reverse the shape change of the first SMA rotary-driver and rotationally uncouple the first SMA rotary driver from the hub. A second SMA rotary-driver, which when heated undergoes a shape change to rotationally couple with the hub and rotate the hub in the predetermined direction, and which when can be deformed to reverse the shape change to rotationally uncouple from the hub. A second return spring connected with the second SMA rotary-driver for deforming the second SMA rotary-driver, when no longer heated, to reverse the shape change of the second SMA rotary-driver and rotationally uncouple the second SMA rotary-driver from the hub. A control device for heating the first and second SMA rotary-drivers in succession and only one at a time. Thus, the first and second SMA rotary-drivers can take turns to stepwise rotate the hub in the predetermined direction.

13 Claims, 10 Drawing Sheets

STEPPER MOTOR WITH SHAPED MEMORY ALLOY ROTARY-DRIVER

FIELD OF THE INVENTION

The invention relates generally to the field of photography, and in particular to motors for cameras such as used for film winding purposes. More specifically, the invention relates to a stepper motor with a shaped memory alloy rotary-driver.

BACKGROUND OF THE INVENTION

Prior art U.S. Pat. No. 5,279,123 mentions that shaped memory alloy (abbreviated to SMA) devices are well known in the art to undergo a martensitic (diffusionless) transition dependent upon the temperature applied to the SMA device. The SMA device when heated above its transition temperature undergoes a shape change to a memorized shape and when cooled below its transition temperature reverses the shape change from the memorized shape to an original shape. This change in shape can be used to provide mechanical work.

Often, as disclosed in prior art U.S. Pat. No. 5,459,544 issued Oct. 17, 1995, the SMA device is a metallic wire. When electrical current is applied to lead wires connected to opposite ends of the SMA wire, the SMA wire is heated to due to electrical resistance and it shrinks or contacts, i.e. recovers, to a memorized shape. When the electrical current is cut, the SMA wire cools to extend, i.e. deform, to an original shape.

SUMMARY OF THE INVENTION

According to one aspect of the invention, a stepper motor comprises:

a rotatable hub;

a first shaped memory alloy (abbreviated to SMA) rotary-driver, which when heated undergoes a shape change to rotationally couple with the hub and rotate the hub in a predetermined direction, and which can be deformed to reverse the shape change to rotationally uncouple from the hub;

a first return spring connected with the first SMA rotary-driver for deforming the first SMA rotary-driver, when no longer heated, to reverse the shape change of the first SMA rotary-driver and rotationally uncouple the first SMA rotary driver from the hub;

a second SMA rotary-driver, which when heated undergoes a shape change to rotationally couple with the hub and rotate the hub in the predetermined direction, and which when can be deformed to reverse the shape change to rotationally uncouple from the hub;

a second return spring connected with the second SMA rotary-driver for deforming the second SMA rotary-driver, when no longer heated, to reverse the shape change of the second SMA rotary-driver and rotationally uncouple the second SMA rotary-driver from the hub; and a control device for heating the first and second SMA rotary-drivers in succession and only one at a time, whereby the first and second SMA rotary-drivers can take turns to stepwise rotate the hub in the predetermined direction.

According to another aspect of the invention, a method of rotating a film spool in a film winding direction in a camera comprises the steps:

heating a first shaped memory alloy (abbreviated to SMA) rotary-driver to undergo a shape change, which rotationally couples the first SMA rotary-driver with the film spool and rotates the film spool a predetermined angle in the film winding direction;

discontinuing heating the first SMA rotary-driver to allow a first return spring to reverse the shape change of the first SMA rotary-driver, which rotationally uncouples the first SMA rotary-driver from the film spool;

heating a second shaped memory alloy (abbreviated to SMA) rotary-driver to undergo a shape change, which rotationally couples the second SMA rotary-driver with the film spool and rotates the film spool the predetermined angle in the film winding direction, ; and discontinuing heating the first SMA rotary-driver to allow a first return spring to reverse the shape change of the first SMA rotary-driver, which rotationally uncouples the first SMA rotary-driver from the film spool.

According to another aspect of the invention, a motorized camera comprises:

a main body part including a chamber for a film spool having an engageable end portion;

a driven hub rotatable in a film winding direction, longitudinally extending into the chamber, and configured to coaxially engage the engageable end portion of the film spool in the chamber to rotate the film spool in the film winding direction;

a first drive ring which encircles the hub, is rotatable in the film winding direction to coaxial engage with the hub and rotate the hub in the film winding direction, and is rotatable in a reverse direction to disengage from the hub;

a first shaped memory alloy (abbreviated to SMA) rotary-driver having one end connected to the first drive ring and another end fixed to the main body part, which when heated undergoes a shape change to rotate the first drive ring in the film winding direction, and which can be deformed to reverse the shape change;

a first return spring having one end fixed to the main body part and another end connected with the first drive ring to rotate the first drive ring in the reverse direction to deform the first SMA rotary-driver, when no longer heated, to reverse the shape change of the first SMA rotary-driver;

a second drive ring which encircles the hub, is rotatable in the film winding direction to coaxial engage with the hub and rotate the hub in the film winding direction, and is rotatable in the reverse direction to disengage from the hub;

a second SMA rotary-driver having one end connected to the second drive ring and another end fixed to the main body part, which when heated undergoes a shape change to rotate the second drive ring in the film winding direction, and which can be deformed to reverse the shape change;

a second return spring having one end fixed to the main body part and another end connected with the second drive ring to rotate the second drive ring in the reverse direction to deform the second SMA rotary-driver, when no longer heated, to reverse the shape change of the second SMA rotary-driver; and a control device for heating the first and second SMA rotary-drivers in succession and only one at a time, whereby the first and second SMA rotary-drivers can take turns to stepwise rotate the hub in the film winding direction.

DETAILED DESCRIPTION OF THE INVENTION

The invention is disclosed as being embodied preferably in a motorized camera. Because the features of a motorized camera are generally known, the description which follows is directed in particular only to those elements forming part of or cooperating directly with the disclosed embodiment. It is to be understood, however, that other elements may take various forms known to a person of ordinary skill in the art.

Figure 1:
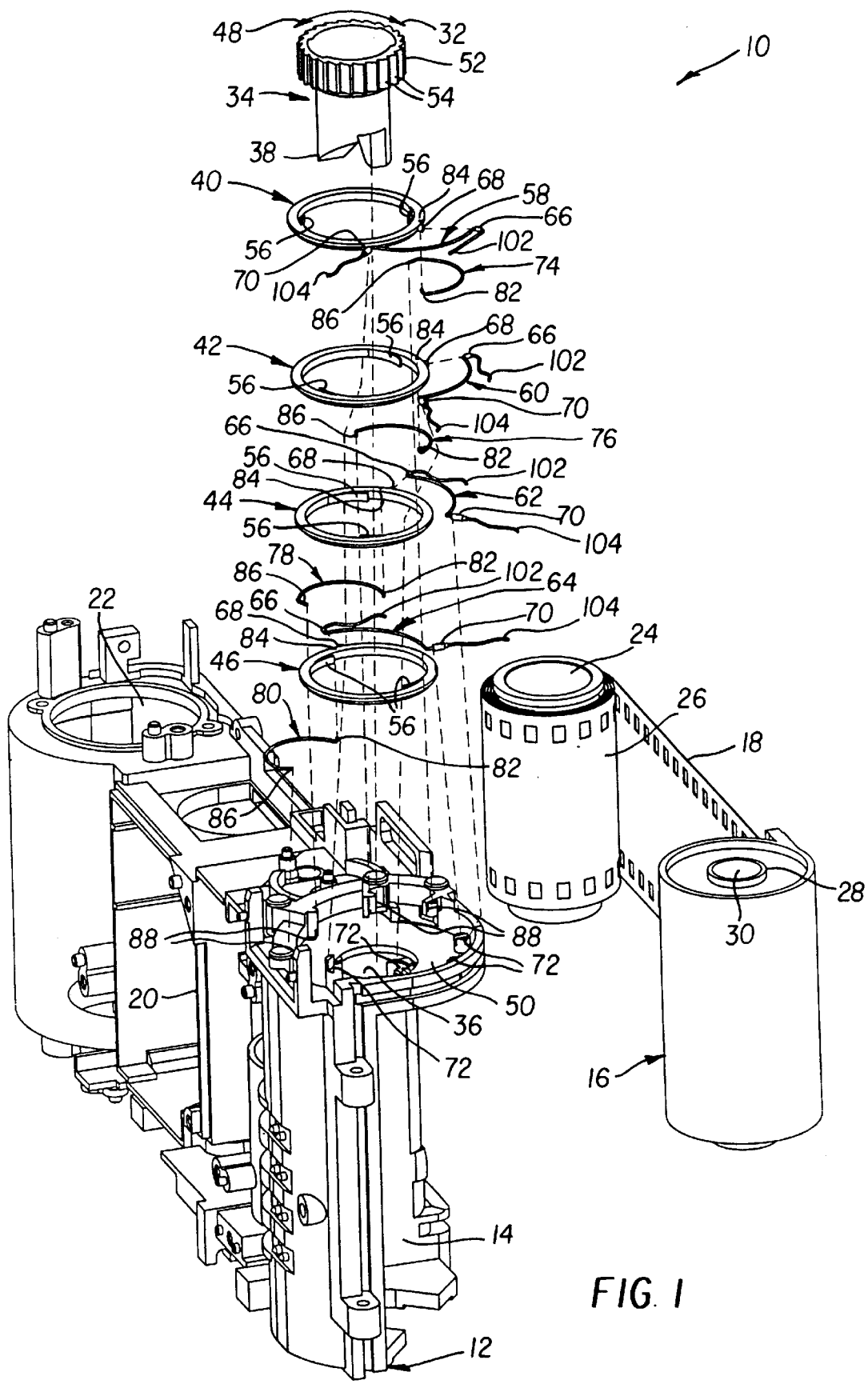
FIG. 1 is an exploded front bottom perspective view of a motorized camera which includes a stepper motor with a shaped memory alloy (abbreviated to SMA) rotary-driver for film winding, in a preferred embodiment of the invention.
Figure 2:
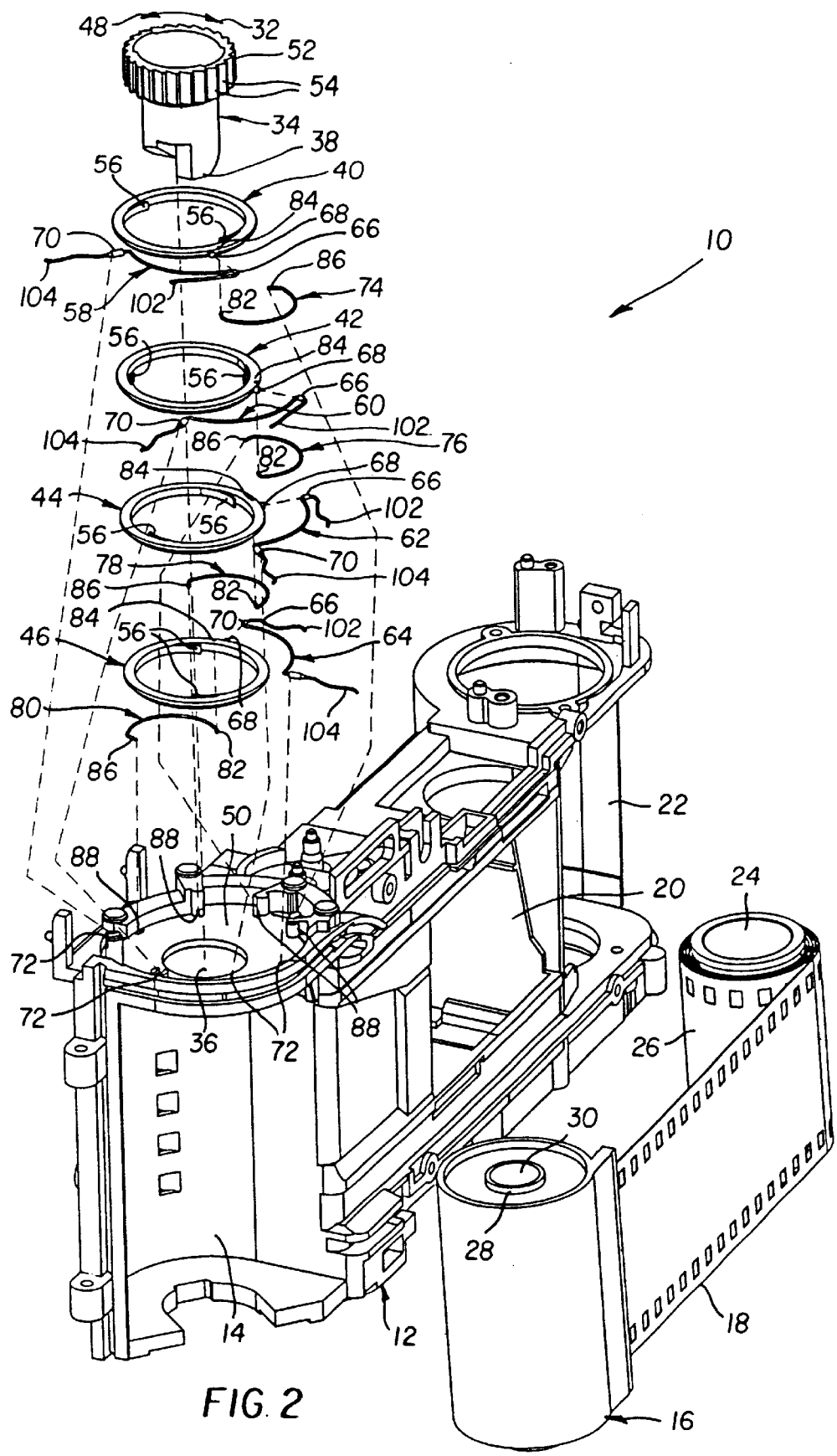
FIG. 2 is an exploded rear bottom perspective of the motorized camera.
Figure 3:
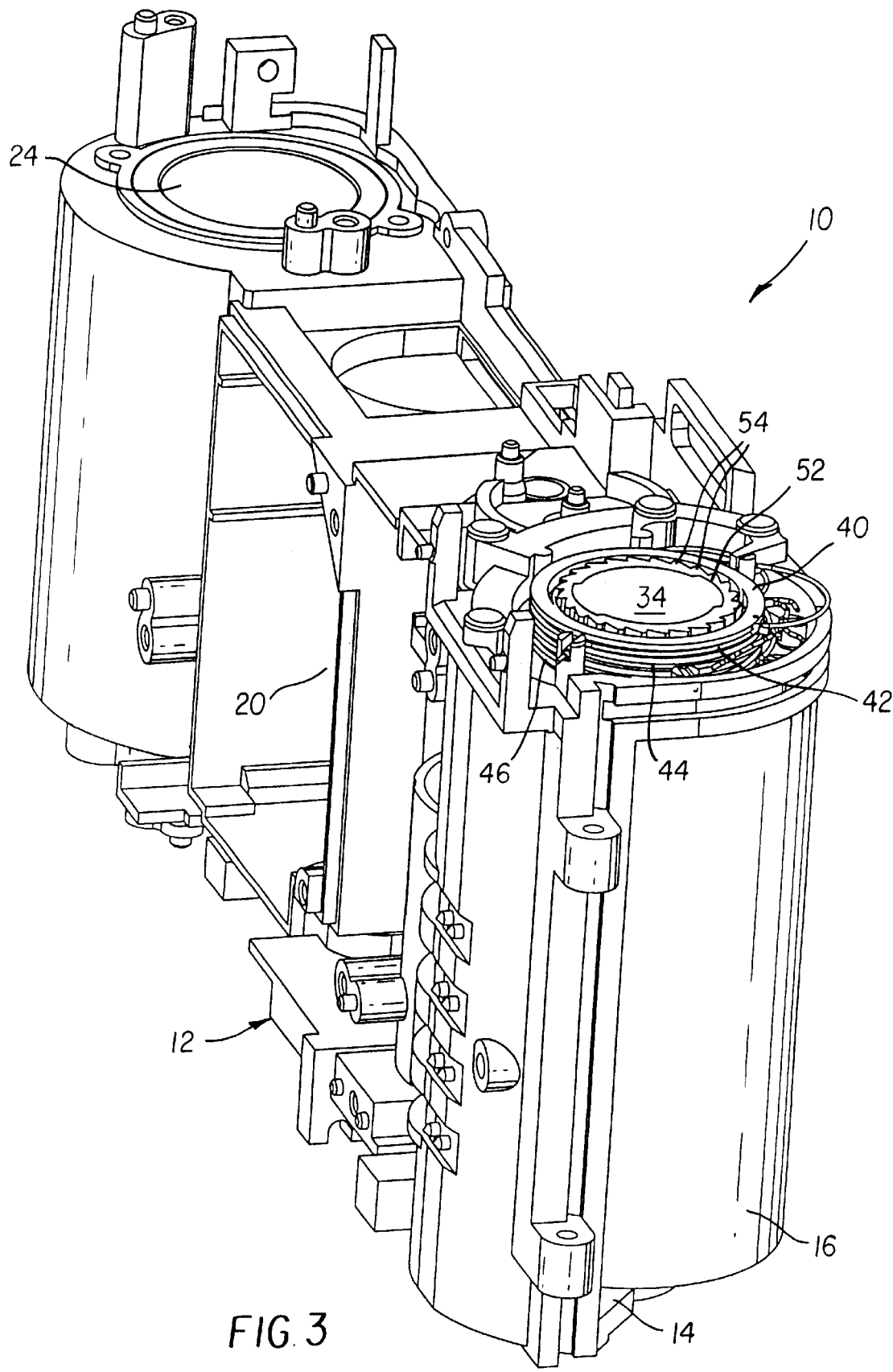
FIG. 3 is an assembled front bottom perspective view of the motorized camera.
Figure 4:
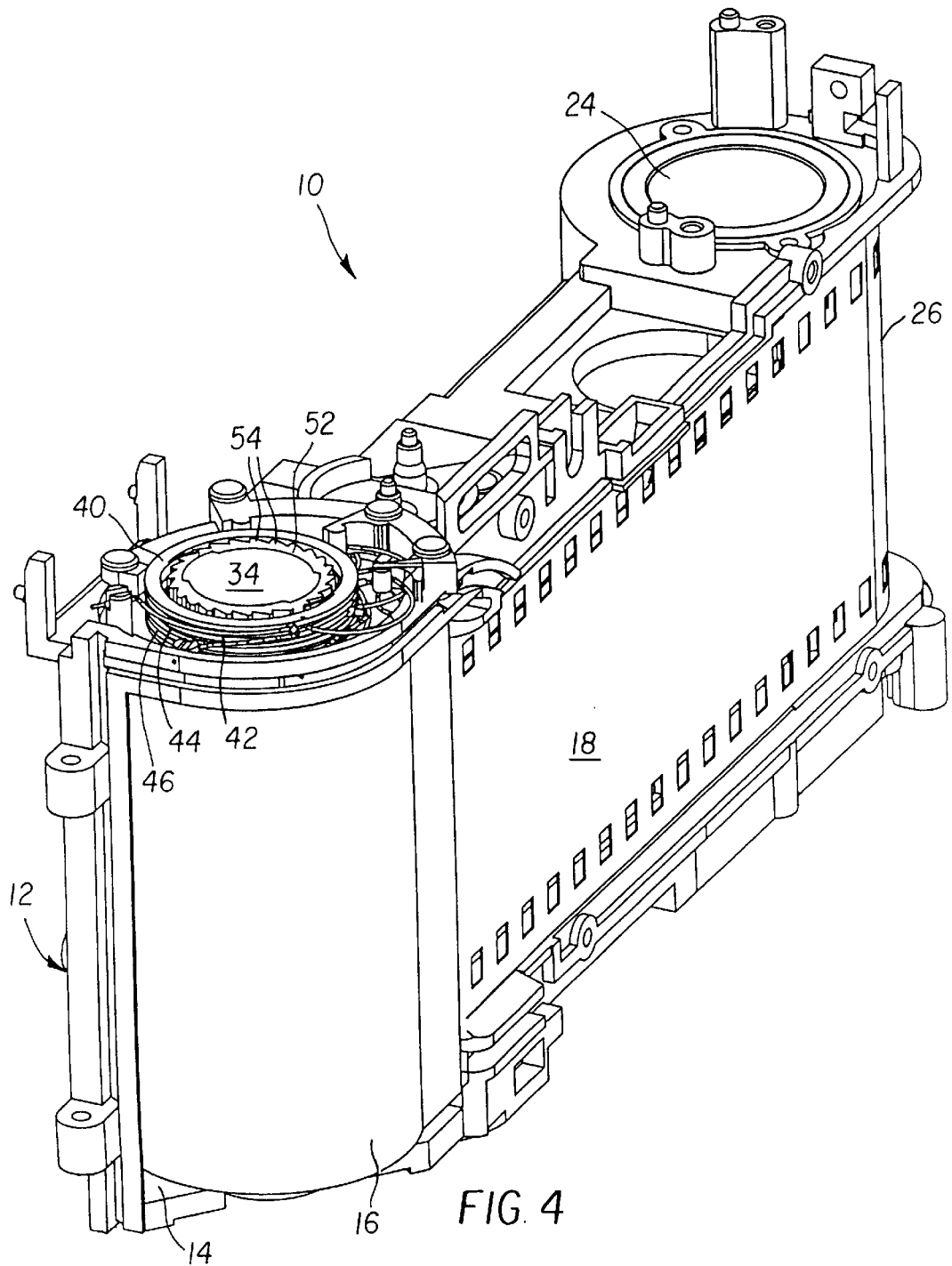
FIG. 4 is an assembled rear bottom perspective view of the motorized camera.
Figure 5:
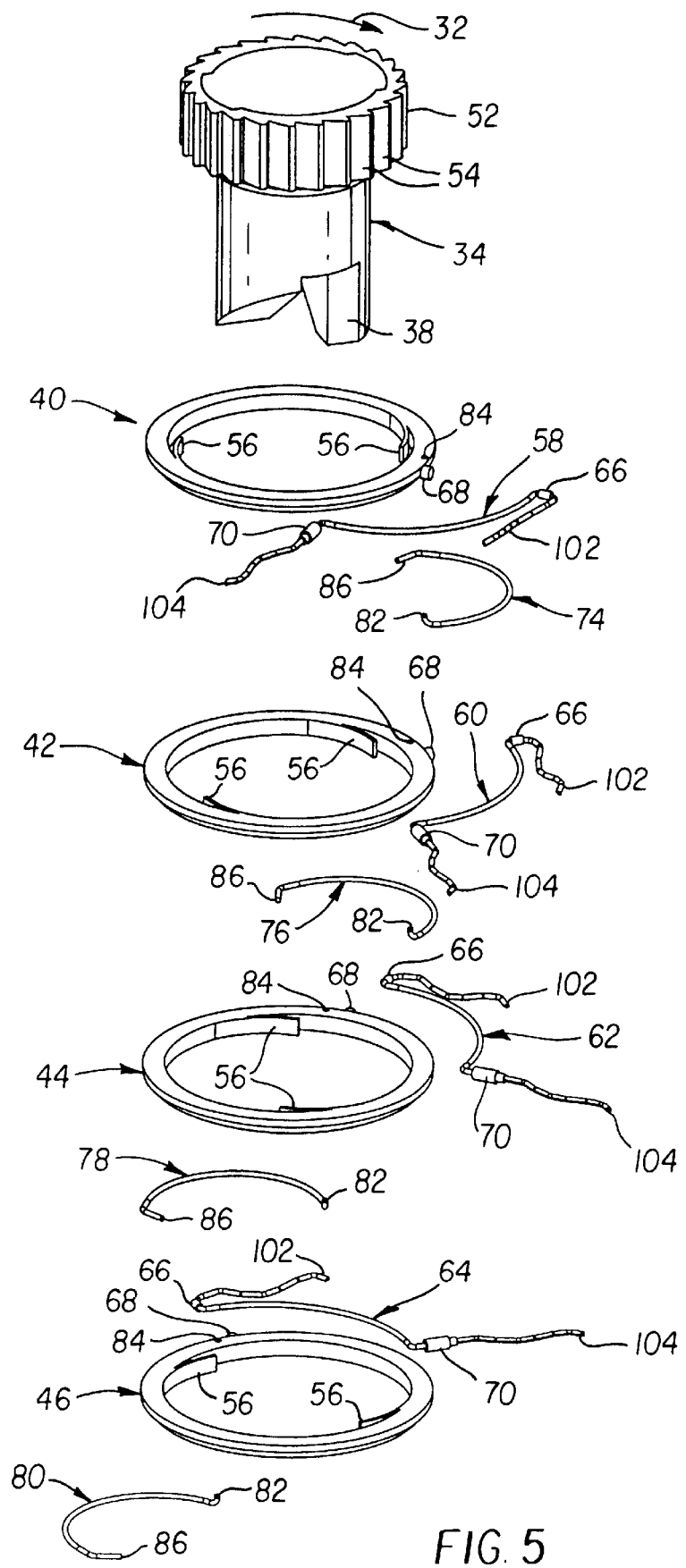
FIG. 5 is an exploded front bottom perspective view of the stepper motor.

Referring now to the drawings, FIGS. 1–4 partially show a motorized camera 10 including a main body part 12. The main body part 12 as seen in FIG. 2 has a rearwardly open cartridge receiving chamber 14 for a conventional film cartridge 16 with a filmstrip 18, a rearwardly open backframe opening 20 at which successive sections of the filmstrip are exposed, and a rearwardly exposed film take-up chamber 22 that contains a film take-up spool 24 for winding the exposed film sections into an exposed film roll 26. Front and rear cover parts for the main body part 12, and a film door for closing the cartridge receiving chamber 14, are not shown. As is typical, the film cartridge 16 includes a cartridge film spool having an accessible spool end 28 which may be engaged within a center opening 30 in the accessible spool end to rotate the cartridge spool in a film winding direction 32. This is done to wind the exposed film into the film cartridge 16.

A driven hub or spindle 34, rotatable in the film winding direction 32, longitudinally extends through an ingress hole 36 in the main body part 12 and into the cartridge receiving chamber 14. See FIGS. 1–4. This allows a forked free end 38 of the hub 34 to be located within the center opening 30 in the accessible spool end 28 of the cartridge spool, to coaxially engage the cartridge spool in order to rotate the cartridge spool in the film winding direction 32.

First, second, third and fourth identical drive rings 40, 42, 44 and 46 (having the same diameter) are compactly stacked parallel and adjacent to one another, encircling the hub 34, and supported for rotation in the film winding direction 32 and a reverse direction 48 at a nest or cavity 50 in the main body part 12. See FIGS. 1–5. The hub 34 includes a known ratchet 52 having a circular (continuous) array of identical peripheral teeth 54 which are similarly inclined to allow them to be individually engaged to rotate the hub only in the film winding direction 32. The first, second, third and fourth drive rings 40, 42, 44 and 46 each have a pair of identical inner teeth 56 spaced 180° apart for separately engaging any two of the peripheral teeth 54 spaced 180° apart on the ratchet 52, to coaxially engage any one of the drive rings with the hub when any one of the drive rings is rotated in the film winding direction 32. The inner teeth 56 of the respective drive rings 40, 42, 44 and 46 are flexible to be bent out of engagement with the peripheral teeth 54 of the ratchet 52 when any one of the drive rings is rotated in the reverse direction 48, and they are resilient to resume their original shape when disengaged from the peripheral teeth of the ratchet.

First, second, third and fourth identical shaped memory alloy (abbreviated to SMA) rotary-drivers 58, 60, 62 and 64 each have one of their ends 66 connected to the respective drive rings 40, 42, 44 and 46 at individual peripheral fasteners 68 on the drive rings and another of their ends 70 fixed to the main body part 12 within individual slots 72 in the main body part. See FIGS. 1, 2 and 5. The first, second, third and fourth SMA rotary-drivers 58, 60, 62 and 64 are evenly spaced 45° apart about the hub 34 and are similarly curved generally in a c-configuration to individually contract (recover) curvewise when heated to undergo a shape change to a memory shape, and they can individually expand (deform) curvewise when no longer heated to reverse the shape change. This is shown in FIGS. 5–9. When the first, second, third and fourth SMA rotary-drivers 58, 60, 62 and 64 are successively contracted curvewise as shown in FIGS. 6–9, they successively rotate the respective drive rings 40, 42, 44 and 46 an angle of 45° in the film winding direction 32 to rotate the hub 34 a total of 180° in the same direction. Conversely, when the first, second, third and fourth SMA rotary-drivers 58, 60, 62 and 64 are individually expanded curvewise as shown in FIGS. 7–9 and 5, the respective drive rings 40, 42, 44 and 46 are successively rotated an angle of 45° in the reverse direction 48 without similarly rotating the hub 34 (because the inner teeth 56 of the respective drive rings are bent out of engagement with the peripheral teeth 54 of the ratchet 52).

First, second, third and fourth identical return springs 74, 76, 78 and 80 each have one of their ends 82 connected to the respective drive rings 40, 42, 44 and 46 within individual peripheral holes 84 in the drive rings and another of their ends 86 fixed to the main body part 12 within individual slots 88 in the main body part. See FIGS. 1, 2 and 5. The first, second, third and fourth return springs 74, 76, 78 and 80 are evenly spaced 45° apart from one another about the hub 34 and are similarly curved generally in a c-configuration to individually be distorted curvewise from an original shape when the respective SMA rotary-drivers 58, 60, 62 and 64 contract curvewise due to being heated, and they can individually recover curvewise back to their original shape to reverse the shape change of the respective SMA rotary-drivers when the respective SMA rotary-drivers are no longer heated. This is shown in FIGS. 5–9. When the first, second, third and fourth SMA rotary-drivers 58, 60, 62 and 64 are successively heated they contract curvewise as shown in FIGS. 6–9 to successively rotate the respective drive rings 40, 42, 44 and 46 an angle of 45° in the film winding direction 32. The successive rotation of the respective drive rings 40, 42, 44 and 46 in the film winding direction 32 successively deforms the first, second, third and fourth return springs 74, 76, 78 and 80 curvewise from their original shape. Conversely, when the first, second, third and fourth SMA rotary-drivers 58, 60, 62 and 64 successively no longer heated, the first, second, third and fourth return springs 74, 76, 78 and 80 successively contract curvewise as shown in FIGS. 7–9 and 5, and they successively rotate the respective drive rings 40, 42, 44 and 46 an angle of 45° in the reverse direction 48. The successive rotation of the respective drive rings 40, 42, 44 and 46 in the reverse direction 48 reverses the shape change of the respective SMA rotary-drivers 58, 60, 62 and 64.

Figure 10:
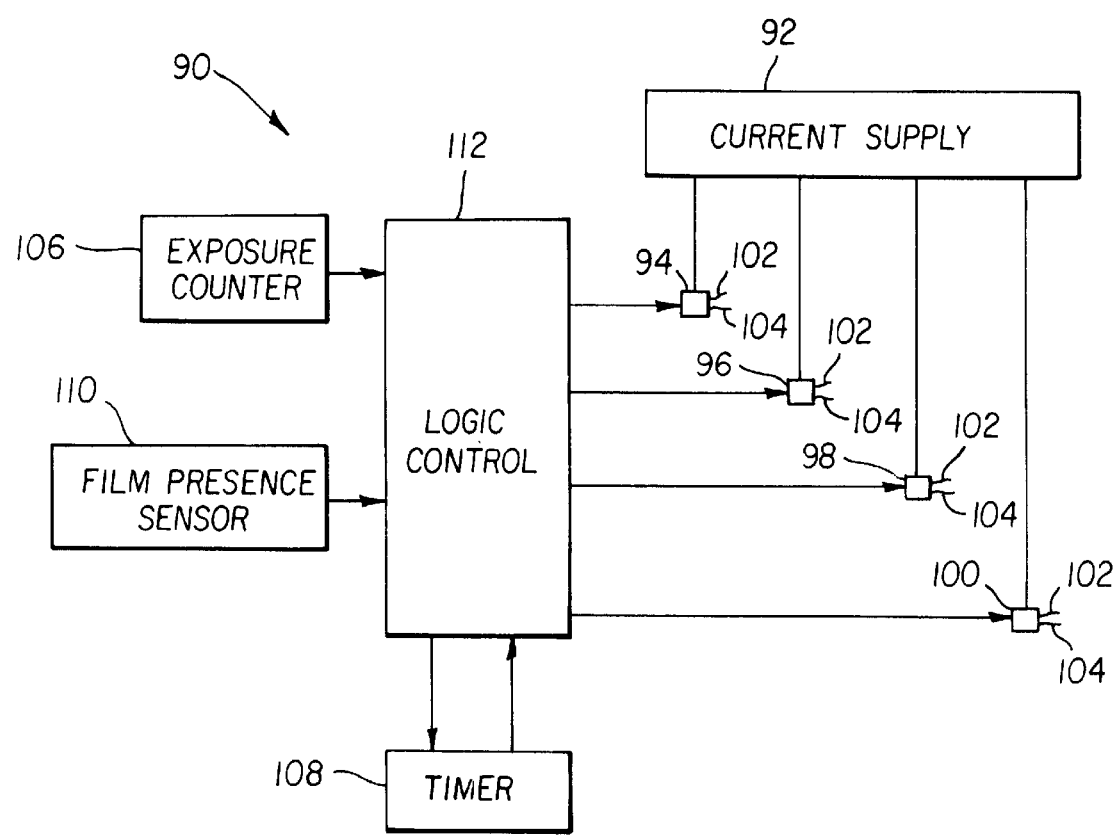
FIG. 10 is a schematic diagram depicting a control device for the stepper motor.

As shown in FIG. 10, a control device 90 for heating the first, second, third and fourth SMA rotary-drivers 58, 60, 62 and 64 in succession and only one at a time includes a known current supply 92 for supplying electrical current to the respective SMA rotary-drivers to heat the respective SMA rotary-drivers, first, second, third and fourth normally open switches 94, 96, 98 and 100 which when individually closed connect the current supply to individual pairs of wire leads 102 and 104 to the respective SMA rotary -rivers and when individually re-opened disconnect the current supply from the respective SMA rotary-drivers, a known exposure counter 106 for indicating that a last available exposure has been made, a known timer 108 for indicating each time a predetermined time interval has elapsed, a known film presence sensor 110 for indicating that the filmstrip 18 is completely wound into the film cartridge 16, and a known logic control 112 connected to the exposure counter and the timer for closing and re-opening the respective switches to supply electrical current from the current supply to the respective SMA rotary-drivers in succession and only one at a time beginning with the exposure counter indicating that the last available exposure has been made and ending with the film presence sensor indicating that the filmstrip is completely wound into the film cartridge, and in accordance with each time the timer indicates that the predetermined time interval has elapsed.

Operation

Figure 6:
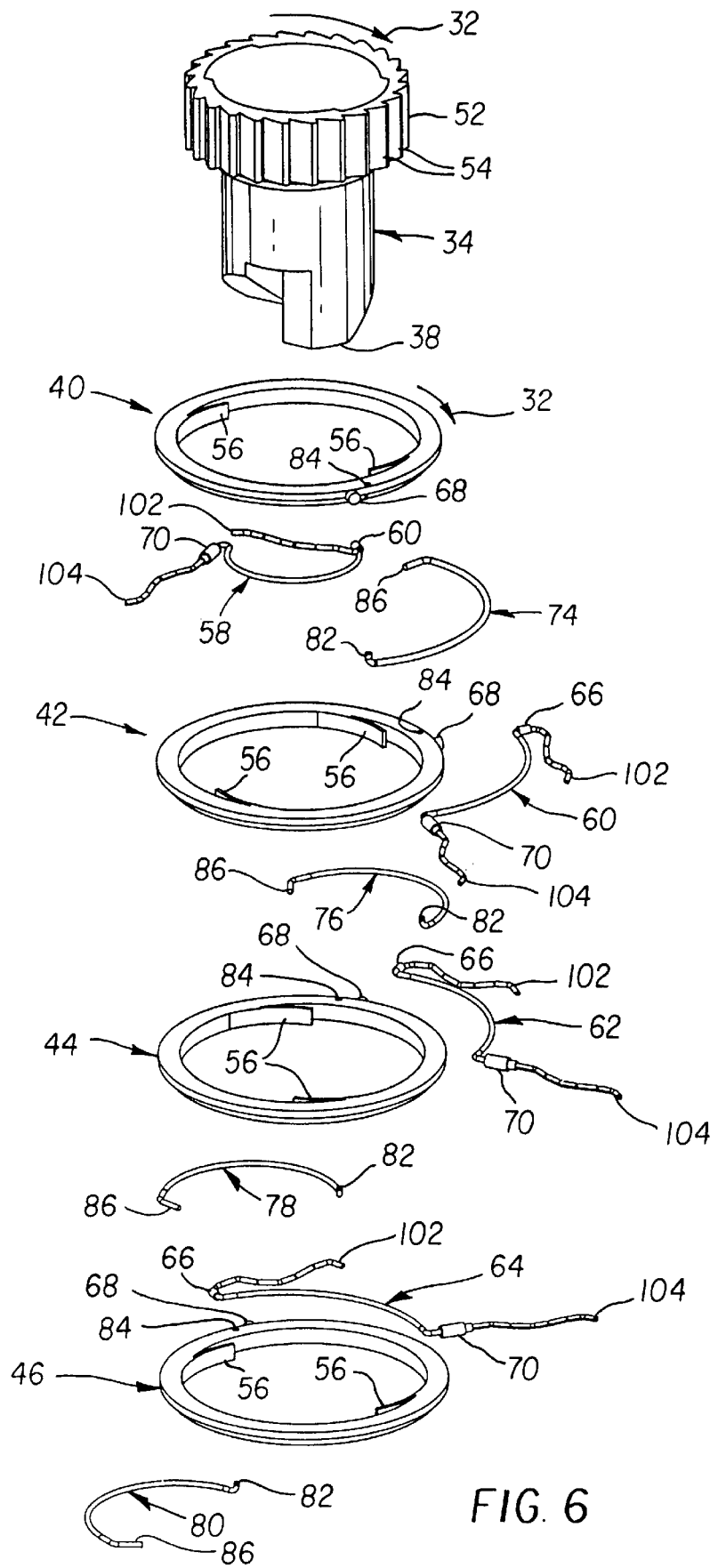
FIGS. 6, 7, 8 and 9 are exploded views similar to FIG. 5, showing sequential steps in the operation of the stepper motor.

When the exposure counter 106 indicates to the logic control 112 that the last available exposure has been made, the logic control activates the timer 108 and simultaneously closes the first switch 94. Closing the first switch 94 connects the current supply 92 to the first SMA rotary-driver 58 to heat the first SMA rotary-driver. The first SMA rotary diver 58 when heated is contracted curvewise to undergo its shape change to the memory shape, which rotates the first drive ring 40 an angle of 45° in the film winding direction 32 to similarly rotate the hub 34 and to distort the first return spring 74 curvewise from its original shape. This is shown in FIG. 6.

Figure 7:
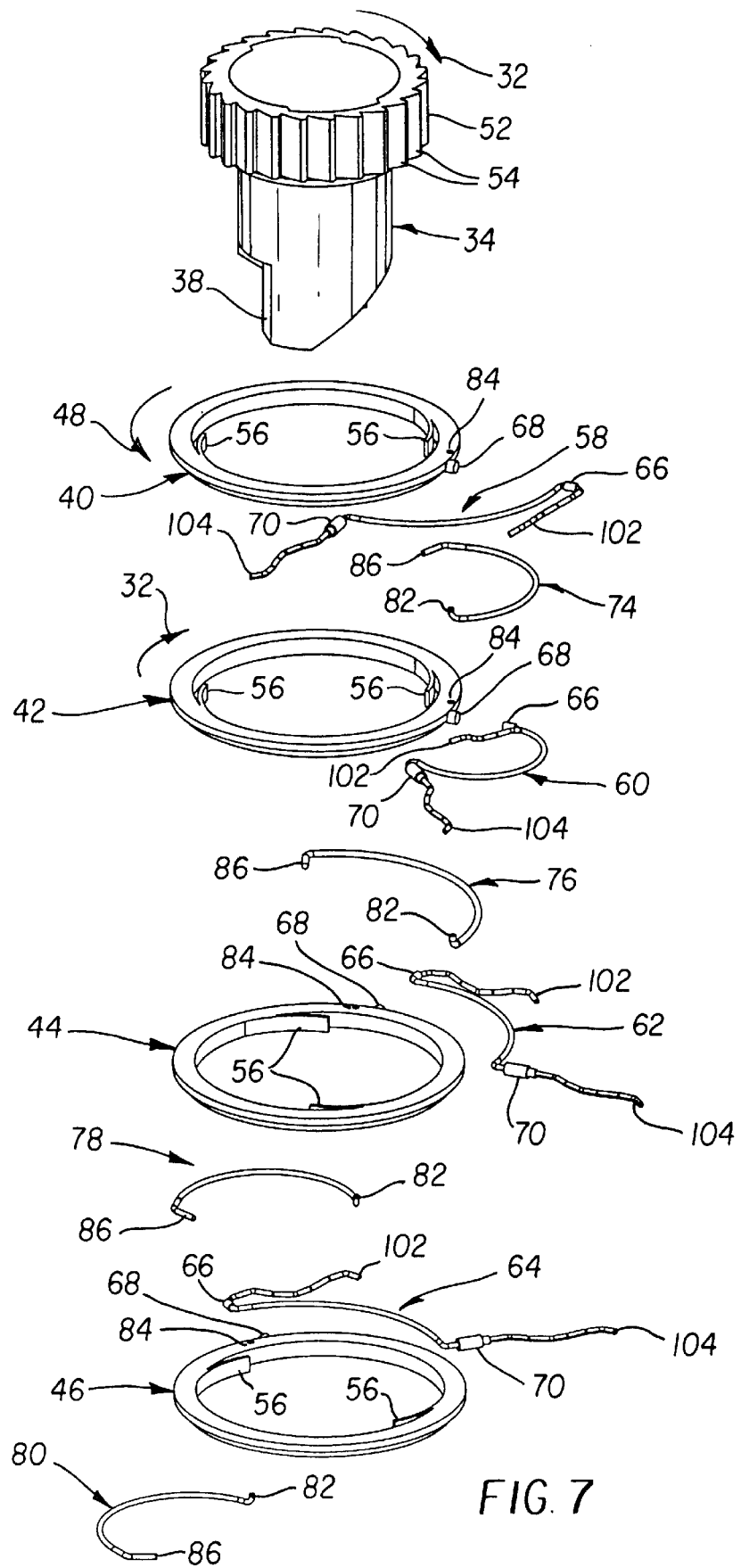

As the first drive ring 40 completes its rotation of 45°, the timer 108 indicates to the logic control 112 that the predetermined time interval has elapsed. The logic control 112 then closes the second switch 96 and re-opens the first switch 94. Re-opening the first switch 94 disconnects the current supply 92 to the first SMA rotary-driver 58, which ends heat to the first SMA rotary-driver and allows the first return spring 74 to contract curvewise to its original shape to rotate the first drive ring 40 an angle of 45° in the reverse direction 48 to reverse the shape change of the first SMA rotary-driver 58. This is shown in FIG. 7. Closing the second switch 96 connects the current supply 92 to the second SMA rotary-driver 60 to heat the second SMA rotary-driver. The second SMA rotary-driver 60 when heated is contracted curvewise to undergo its shape change, which rotates the second drive ring 42 an angle of 45° in the film winding direction 32 to similarly rotate the hub 34 and to distort the second return spring 76 curvewise from its original shape. This is shown in FIG. 7.

Figure 8:
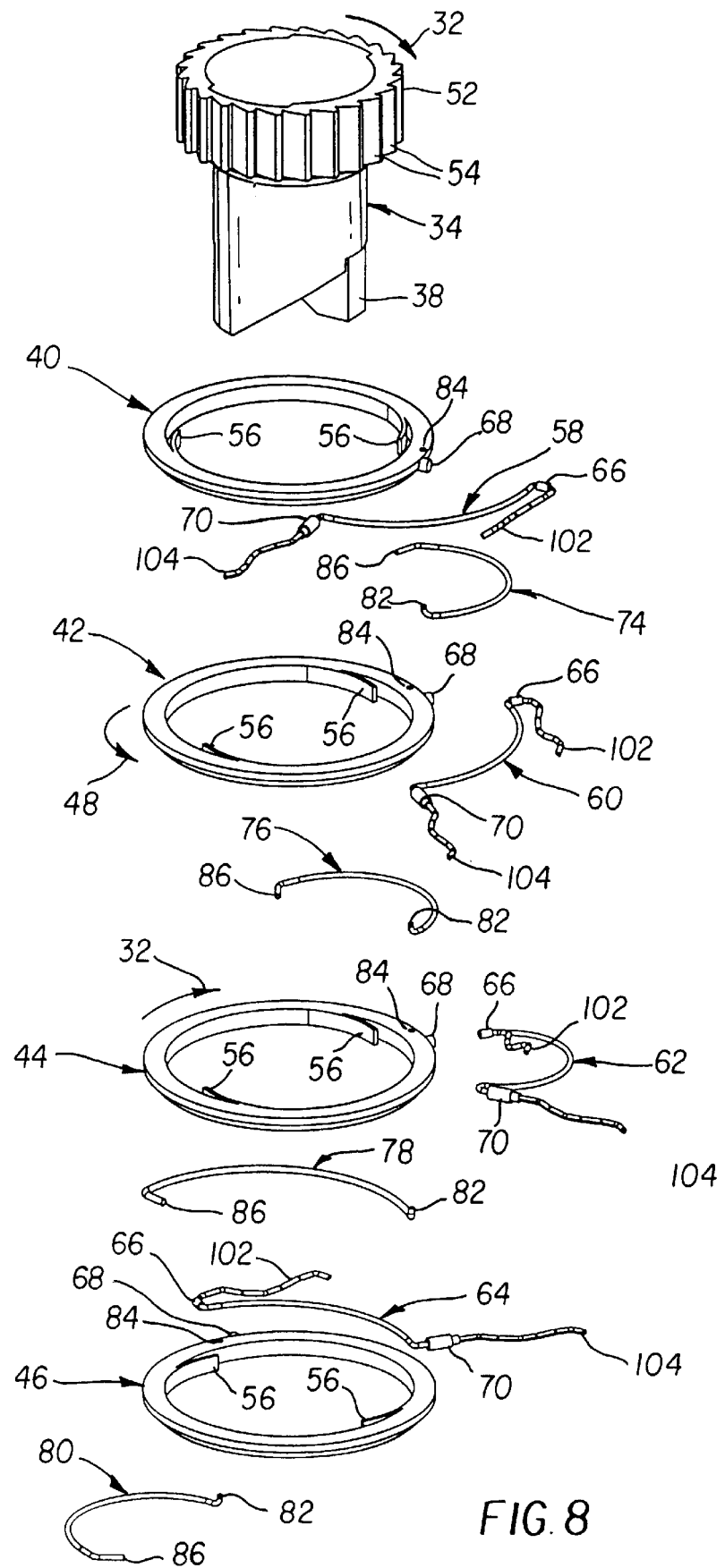

As the second drive ring 42 completes its rotation of 45°, the timer 108 indicates to the logic control 112 that the predetermined time interval has elapsed. The logic control 112 then closes the third switch 98 and re-opens the second switch 96. Re-opening the second switch 96 disconnects the current supply 92 to the second SMA rotary diver 60, which ends heat to the second SMA rotary-driver and allows the second return spring 76 to contract curvewise to its original shape to rotate the second drive ring 42 an angle of 45° in the reverse direction 48 to reverse the shape change of the second SMA rotary-driver 60. This is shown in FIG. 8. Closing the third switch 98 connects the current supply 92 to the third SMA rotary-driver 62 to heat the third SMA rotary-driver. The third SMA rotary-driver 62 when heated is contracted curvewise to undergo its shape change, which rotates the third drive ring 44 an angle of 45° in the film winding direction 32 to similarly rotate the hub 34 and to distort the third return spring 78 curvewise from its original shape. This is shown in FIG. 8.

Figure 9:
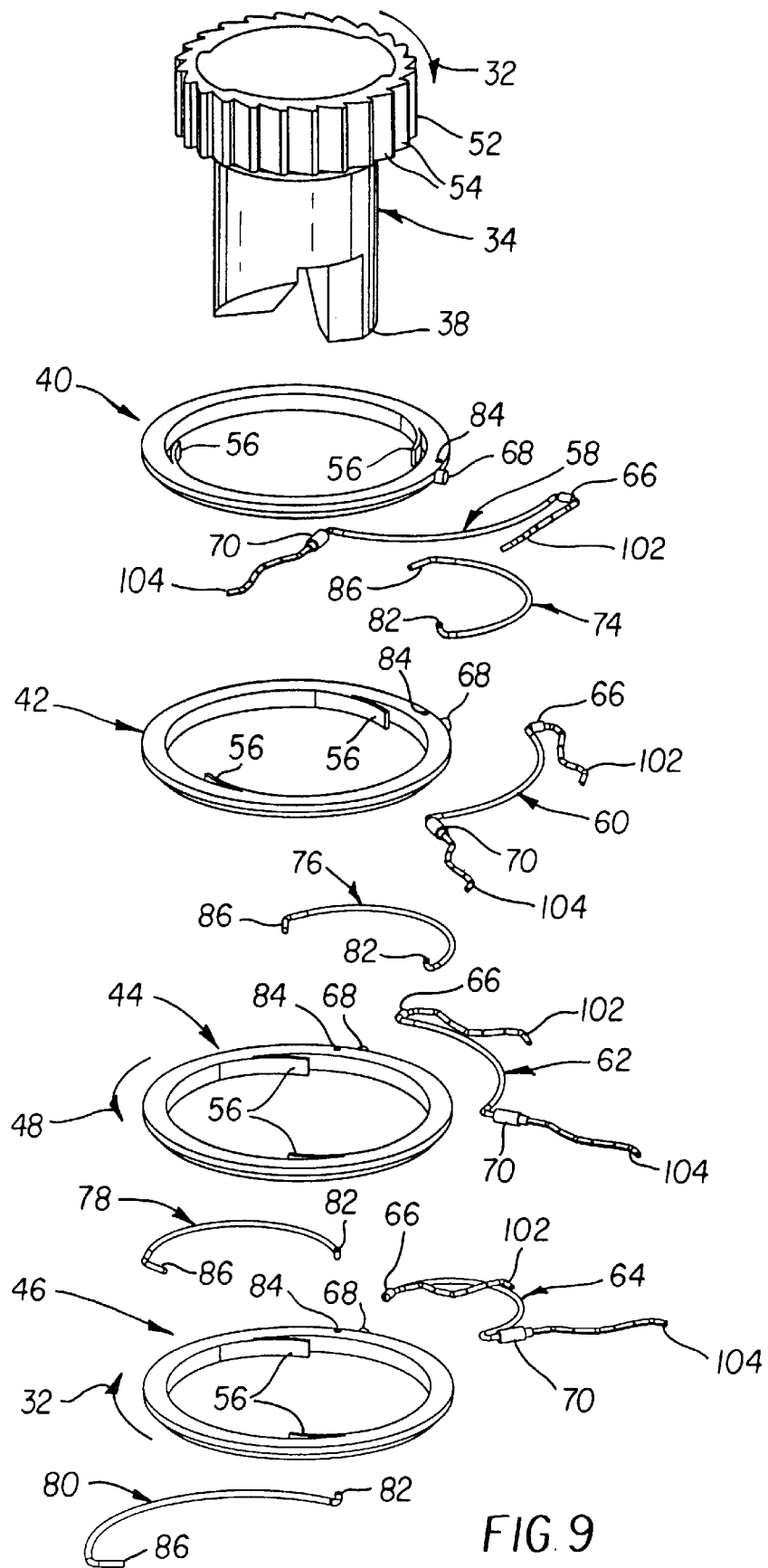

As the third drive ring 44 completes its rotation of 45°, the timer 108 indicates to the logic control 112 that the predetermined time interval has elapsed. The logic control 112 then closes the fourth switch 100 and re-opens the third switch 98. Re-opening the third switch 98 disconnects the current supply 92 to the third SMA rotary-driver 62, which ends heat to the third SMA rotary-driver and allows the third return spring 78 to contract curvewise to its original shape to rotate the third drive ring 44 an angle of 45° in the reverse direction 48 to reverse the shape change of the third SMA rotary-driver 62. This is shown in FIG. 9. Closing the fourth switch 100 connects the current supply 92 to the fourth SMA rotary diver 64 to heat the fourth SMA rotary-driver. The fourth SMA rotary-driver 64 when heated is contracted curvewise to undergo its shape change, which rotates the fourth drive ring 46 an angle of 45° in the film winding direction 32 to similarly rotate the hub 34 and to distort the fourth return spring 80 curvewise from its original shape. This is shown in FIG. 9.

As the fourth drive ring 46 completes its rotation of 45°, the timer 108 indicates to the logic control 112 that the predetermined time interval has elapsed. The logic control 112 then closes the first switch 94 and re-opens the fourth switch 100. Re-opening the fourth switch 100 disconnects the current supply 92 to the fourth SMA rotary-driver 64, which ends heat to the fourth SMA rotary-driver and allows the fourth return spring 80 to contract curvewise to its original shape to rotate the fourth drive ring 46 an angle of 45° in the reverse direction 48 to reverse the shape change of the fourth SMA rotary-driver 64. Closing the first switch 94 connects the current supply 92 to the first SMA rotary-driver 58 to heat the first SMA rotary-driver. The first SMA rotary-driver 58 when heated is contracted curvewise to undergo its shape change, which rotates the first drive ring 40 an angle of 45° in the film winding direction 32 to similarly rotate the hub 34 and to distort the first return spring 74 curvewise from its original shape. This is shown in FIG. 6.

This cycle is concluded after the film presence sensor 110 indicates to the logic control 112 that the filmstrip 18 is completely wound into the film cartridge 16.

The invention has been described with reference to a preferred embodiment. However, it will be appreciated that variations and modifications can be effected by a person of ordinary skill in the art without departing from the scope of the invention. For example, any number (at least two) of drive rings SMA rotary drivers, and return springs may be used. Also, the hub 34 may be used for any manner of film winding, i.e. it is not limited to winding the filmstrip 19 into the film cartridge 16.

PARTS LIST 10. motorized camera
12. main body part
14. cartridge receiving chamber
16. film cartridge
18. filmstrip
20. backframe opening
22. exposed film take-up chamber
24. film take-up spool
26. exposed fihn roll
28. accessible spool end
30. center opening
32. film winding direction
34. hub
36. ingress hole
38. forked free end
40. first drive ring
42. second drive ring
44. third drive ring
46. fourth drive ring
48. reverse direction
50. nest
52. ratchet
54. peripheral teeth
56. inner teeth
58. first SMA rotary-driver
60. second SMA rotary-driver
62. third SMA rotary-driver
64. fourth SMA rotary-driver
66. driver ends
68. fasteners
70. driver ends
72. slots
74. first return spring
76. second return spring
78. third return spring
80. fourth return spring
82. spring ends
84. holes
86. spring ends
88. slots
90. control device
92. current supply
94. first switch
96. second switch
98. third switch
100. fourth switch
102. wire leads
104. wire leads
106. exposure counter
108. timer
110. film presence sensor
112. logic control

What is claimed is:

1. A stepper motor comprising:
   a rotatable hub;
   a first shaped memory alloy (abbreviated to SMA) rotary-driver, which when heated undergoes a shape change to rotationally couple with said hub and rotate said hub in a predetermined direction, and which can be deformed to reverse the shape change to rotationally uncouple from said hub;
   a first return spring connected with said first SMA rotary-driver for deforming said first SMA rotary-driver, when no longer heated, to reverse the shape change of said first SMA rotary-driver and rotationally uncouple said first SMA rotary driver from said hub;
   a second SMA rotary-driver, which when heated undergoes a shape change to rotationally couple with said hub and rotate said hub in the predetermined direction, and which can be deformed to reverse the shape change to rotationally uncouple from said hub;
   a second return spring connected with said second SMA rotary-driver for deforming said second SMA rotary-driver, when no longer heated, to reverse the shape change of said second SMA rotary-driver and rotationally uncouple said second SMA rotary-driver from said hub; and
   a control device for heating said first and second SMA rotary-drivers in succession and only one at a time, whereby said first and second SMA rotary-drivers can take turns to stepwise rotate said hub in the predetermined direction.

2. A stepper motor as recited in claim 1, wherein said first and second SMA rotary-drivers distort said first and second return springs from an original shape when the respective SMA rotary-drivers undergo the shape change, and said first and second return springs recover to the original shape to deform said first and second SMA rotary-drivers to reverse the shape change of the respective SMA rotary-drivers.

3. A stepper motor as recited in claim 2, wherein said first and second SMA rotary-drivers are similarly curved generally in a c-configuration to individually contract curvewise when heated to undergo the shape change and to individually expand curvewise when deformed to reverse the shape change.

4. A stepper motor as recited in claim 3, wherein said first and second return springs are similarly curved in a c-configuration to individually expand curvewise when said respective SMA rotary-drivers undergo the shape change and to individually contract curvewise to reverse the shape change of said respective SMA rotary-drivers.

5. A stepper motor as recited in claim 1, wherein said hub has a forked free end configured to rotationally engage a film spool to rotate the film spool in the predetermined direction.

6. A stepper motor as recited in claim 1, wherein said first and second SMA rotary-drivers are spaced at least 45° apart from one another about said hub.

7. A stepper motor comprising:
   a rotatable hub;
   a first drive ring which encircles said hub, is rotatable in a predetermined direction to coaxial engage with said hub and rotate said hub in the same direction, and is rotatable in a reverse direction to disengage from said hub;
   a first shaped memory alloy (abbreviated to SMA) rotary-driver having one end connected to said first drive ring and another end that is separately fixed, which when heated undergoes a shape change to rotate said first drive Ting in the predetermined direction, and which can be deformed to reverse the shape change to rotate said first drive ring in the reverse direction;
   a first return spring connected with said first SMA rotary-driver for deforming said first SMA rotary-driver, when no longer heated, to reverse the shape change of said first SMA rotary driver;
   a second drive ring which encircles said hub, is rotatable in the predetermined direction to coaxial engage with said hub and rotate said hub in the same direction, and is rotatable in the reverse direction to disengage from said hub;
   a second SMA rotary-driver having one end connected to said second drive ring and another end that is separately fixed, which when heated undergoes a shape change to rotate said second drive ring in the predetermined direction, and which can be deformed to reverse the shape change to rotate said second drive ring in the reverse direction;

a second return spring connected with said second SMA rotary-driver for deforming said second SMA rotary-driver, when no longer heated, to reverse the shape change of said second SMA rotary-driver; and a control device for heating said first and second SMA rotary-drivers in succession and only one at a time, whereby said first and second SMA rotary-drivers can take turns to stepwise rotate said hub in the predetermined direction.

8. A stepper motor as recited in claim 7, wherein said hub includes a ratchet having a circular array of teeth which are similarly inclined to allow them to be individually engaged to rotate said hub only in the predetermined direction, and said first and second drive rings each have at least one tooth for engaging any one of said teeth of said ratchet to coaxially engage said first or second drive ring with said hub when said first or second drive ring is rotated in the predetermined direction and which is flexible to be bent out of engagement with any one of said teeth of said ratchet when said first or second drive ring is rotated in the reverse direction.

9. A stepper motor as recited in claim 7, wherein said first and second drive rings are stacked parallel and adjacent to one another about said hub and have the same diameter.

10. A motorized camera comprising:

a main body part including a chamber for a film spool having an engageable end portion;

a driven hub rotatable in a film winding direction, longitudinally extending into said chamber, and configured to coaxially engage the engageable end portion of the film spool in said chamber to rotate the film spool in the film winding direction;

a first drive ring which encircles said hub, is rotatable in the film winding direction to coaxial engage with said hub and rotate said hub in the film winding direction, and is rotatable in a reverse direction to disengage from said hub;

a first shaped memory alloy (abbreviated to SMA) rotary-driver having one end connected to said first drive ring and another end fixed to said main body part, which when heated undergoes a shape change to rotate said first drive ring in the fihn winding direction, and which can be deformed to reverse the shape change;

a first return spring having one end fixed to said main body part and another end connected with said first drive ring to rotate said first drive ring in the reverse direction to deform said first SMA rotary-driver, when no longer heated, to reverse the shape change of said first SMA rotary-driver;

a second drive ring which encircles said hub, is rotatable in the film winding direction to coaxial engage with said hub and rotate said hub in the film winding direction, and is rotatable in the reverse direction to disengage from said hub;

a second SMA rotary-driver having one end connected to said second drive ring and another end fixed to said main body part, which when heated undergoes a shape change to rotate said second drive ring in the film winding direction, and which can be deformed to reverse the shape change;

a second return spring having one end fixed to said main body part and another end connected with said second drive ring to rotate said second drive ring in the reverse direction to deform said second SMA rotary-driver, when no longer heated, to reverse the shape change of said second SMA rotary-driver; and a control device for heating said first and second SMA rotary-drivers in succession and only one at a time, whereby said first and second SMA rotary-drivers can take turns to stepwise rotate said hub in the film winding direction.

11. A motorized camera as recited in claim 10, wherein said control device includes a current supply for supplying electrical current to said first and second SMA rotary-drivers to heat the respective SMA rotary-drivers, first and second switches which when individually closed connect said current supply to said respective SMA rotary-drivers and when individually re-opened disconnect said current supply from the respective SMA rotary-drivers, an exposure counter for indicating that a last available exposure has been made, a timer for indicating each time a predetermined time interval has elapsed, and a logic control connected to said exposure counter and said timer for closing and reopening said first and second switches to supply electrical current from said current supply to said first and second SMA rotary-drivers in succession and only one at a time beginning with said exposure counter indicating that the last available exposure has been made and in accordance with each time said timer indicates that the predetermined time interval has elapsed.

12. A motorized camera as recited in claim 10, wherein said main body part supports said first and second drive rings compactly stacked one on the other.

13. A method of rotating a film spool in a film winding direction in a camera, said method comprising the steps:

heating a first shaped memory alloy (abbreviated to SMA) rotary-driver to undergo a shape change, which rotationally couples the first SMA rotary-driver with the film spool and rotates the film spool a predetermined angle in the film winding direction;

discontinuing heating the first SMA rotary-driver to allow a first return spring to reverse the shape change of the first SMA rotary-driver, which rotationally uncouples the first SMA rotary-driver from the film spool;

heating a second shaped memory alloy (abbreviated to SMA) rotary-driver to undergo a shape change, which rotationally couples the second SMA rotary-driver with the film spool and rotates the film spool the predetermined angle in the film winding direction,; and discontinuing heating the first SMA rotary-driver to allow a first return spring to reverse the shape change of the first SMA rotary-driver, which rotationally uncouples the first SMA rotary-driver from the film spool.

* * * * *